United States Patent [19]

Latschaw

[11] Patent Number: 5,647,159

[45] Date of Patent: Jul. 15, 1997

[54] PORTABLE HUNTING BLIND WITH SLIDABLY OPENING TOP

[76] Inventor: Ronald D. Latschaw, P.O. Box 146, Murphy, Oreg. 97533

[21] Appl. No.: 367,462

[22] Filed: Dec. 30, 1994

[51] Int. Cl.⁶ .................................................. A01M 31/00
[52] U.S. Cl. ............................. 43/1; 135/901; 135/157
[58] Field of Search .............................. 43/1; 135/901, 135/900, 157, 97

[56] References Cited

U.S. PATENT DOCUMENTS

| | | | |
|---|---|---|---|
| 2,511,452 | 6/1950 | Anderson | 135/157 |
| 2,816,297 | 11/1957 | Stanley . | |
| 2,828,757 | 4/1958 | Thaxton | 135/97 |
| 2,874,708 | 2/1959 | Daus | 135/157 |
| 2,936,771 | 5/1960 | Marchfield | 135/901 |
| 3,513,605 | 5/1970 | Smith | 52/20 |
| 3,690,334 | 9/1972 | Miller | 43/1 |
| 3,799,608 | 3/1974 | Smutny et al. | 297/184 |
| 3,826,270 | 7/1974 | Hentges | 135/901 |
| 3,913,598 | 10/1975 | Glutting | 135/901 |
| 4,077,418 | 3/1978 | Cohen | 135/157 |
| 4,186,507 | 2/1980 | Stinnett | 43/1 |
| 4,683,672 | 8/1987 | Davis | 43/1 |
| 4,751,936 | 6/1988 | Zibble et al. | 135/117 |
| 4,789,019 | 12/1988 | Sury et al. | 43/1 |
| 4,794,717 | 1/1989 | Horsemann | 43/1 |
| 5,341,588 | 8/1994 | Lizotte | 43/1 |
| 5,377,711 | 1/1995 | Mueller | 43/1 |

*Primary Examiner*—Kurt Rowan
*Attorney, Agent, or Firm*—Keith S. Bergman

[57] ABSTRACT

A portable disassemblable blind for water fowl hunting provides a peripherally defined side frame and a slidably openable top, both supporting peripheral covering. One or more head holes are defined in the inner end of the top to allow one or more hunters to project their heads therethrough for observation. The frame optionally may support one or more seats for support of hunters beneath the head holes. A transverse support maintains guns in a forwardly and upwardly angulated orientation for safety. The openable top is supported by rollers that guide the opening and closing motion of the top on the side frame to insure reliable operability. The first species of blind may be formed without seats and with a low profile for positioning over a pit defined in the earth to provide a concealing cover for hunters therein. A second species of blind provides a semi-rigid plastic covering that is integrally formed with the supporting frame elements to allow manufacture by molding. A third species of blind provides a side frame with releasably attachable legs to further aid portability.

11 Claims, 5 Drawing Sheets

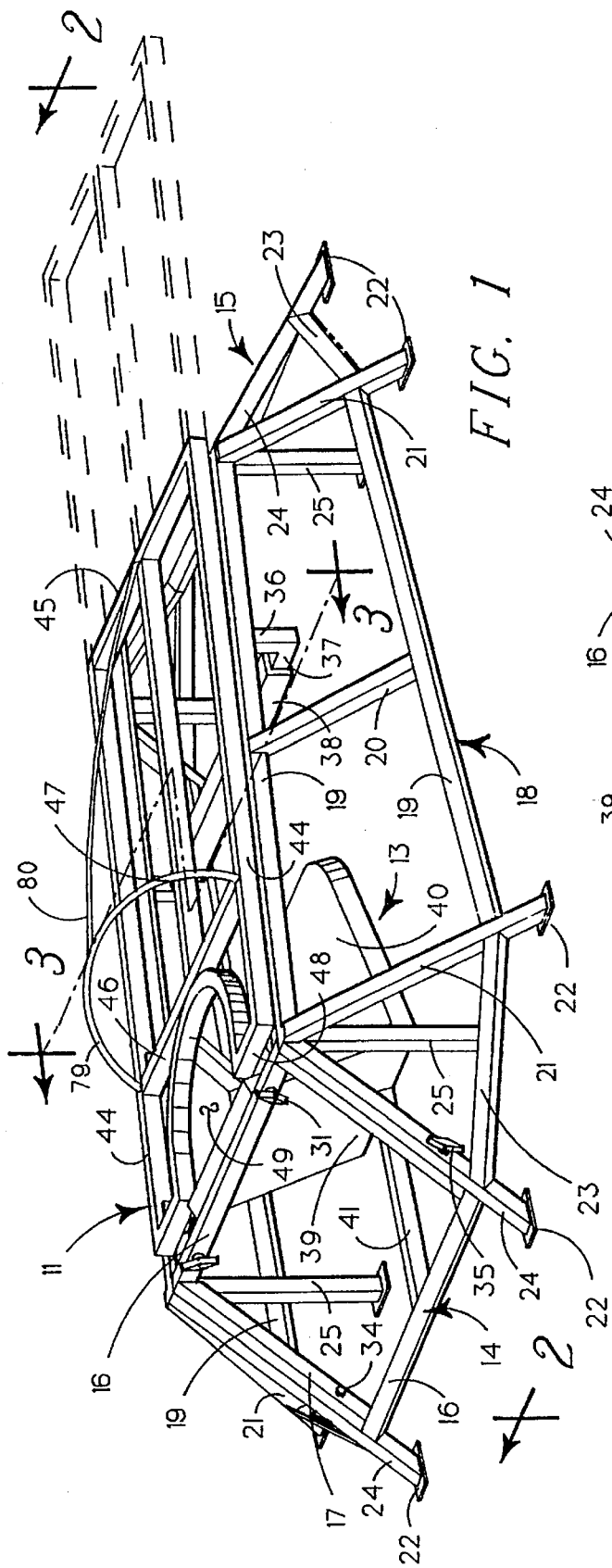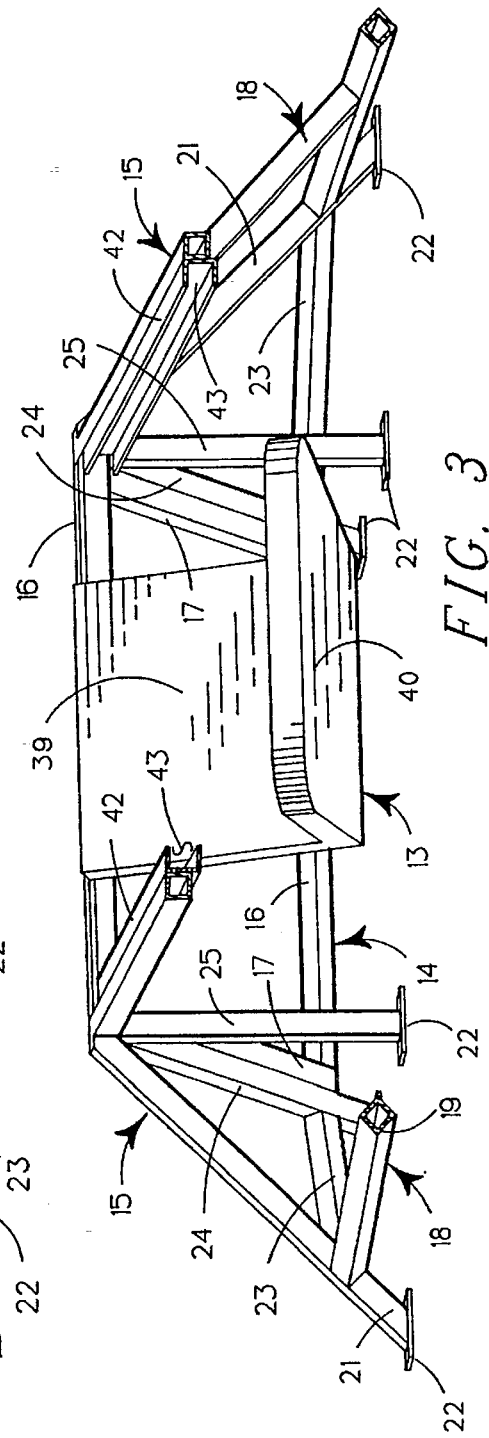

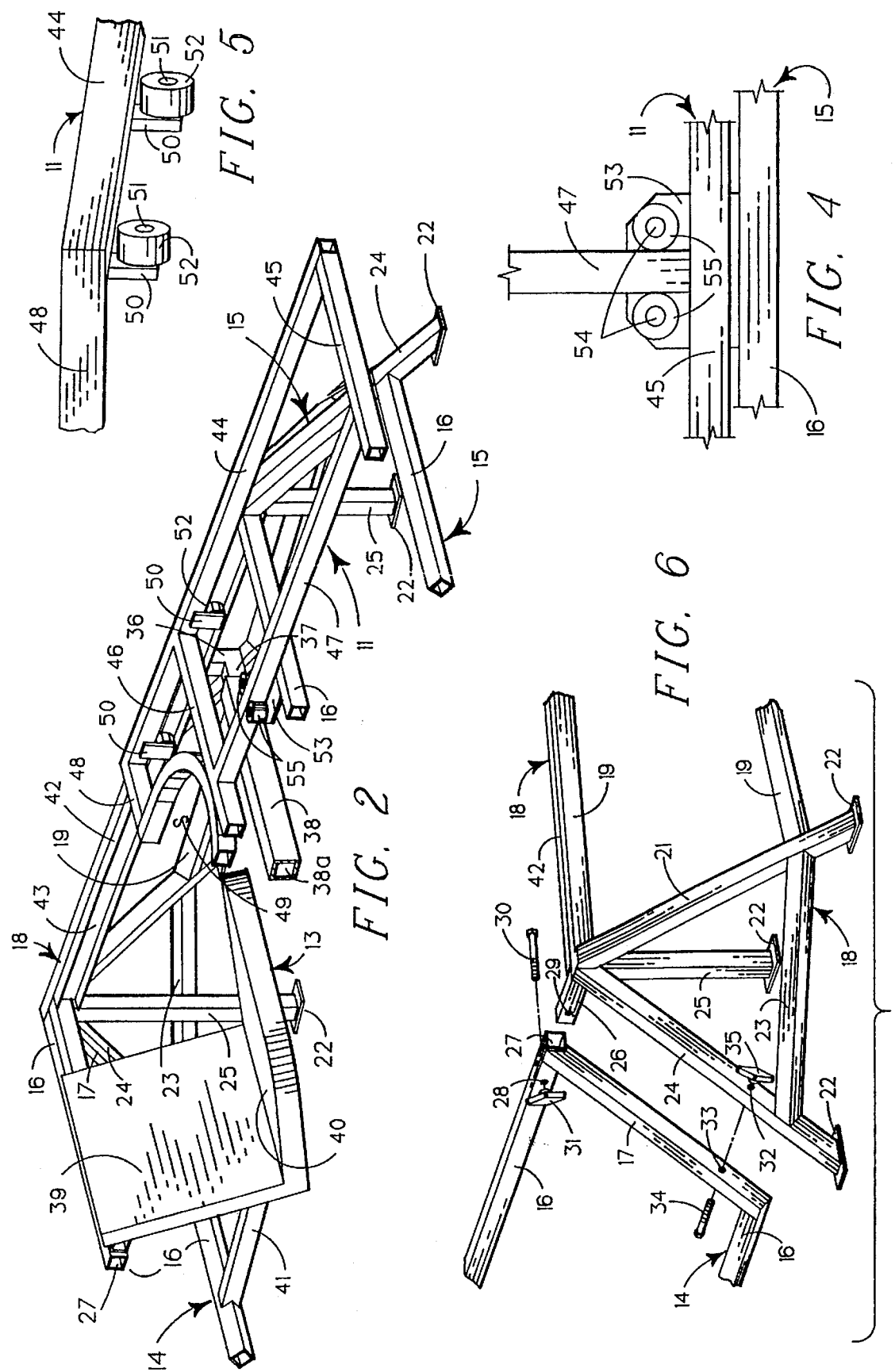

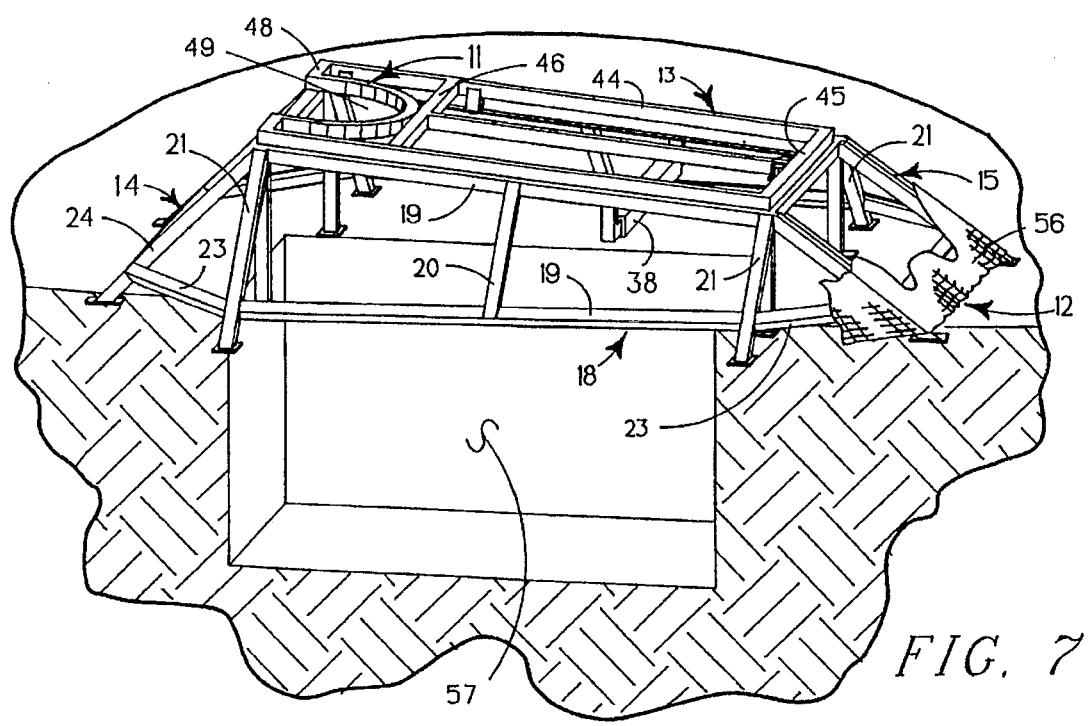
FIG. 7
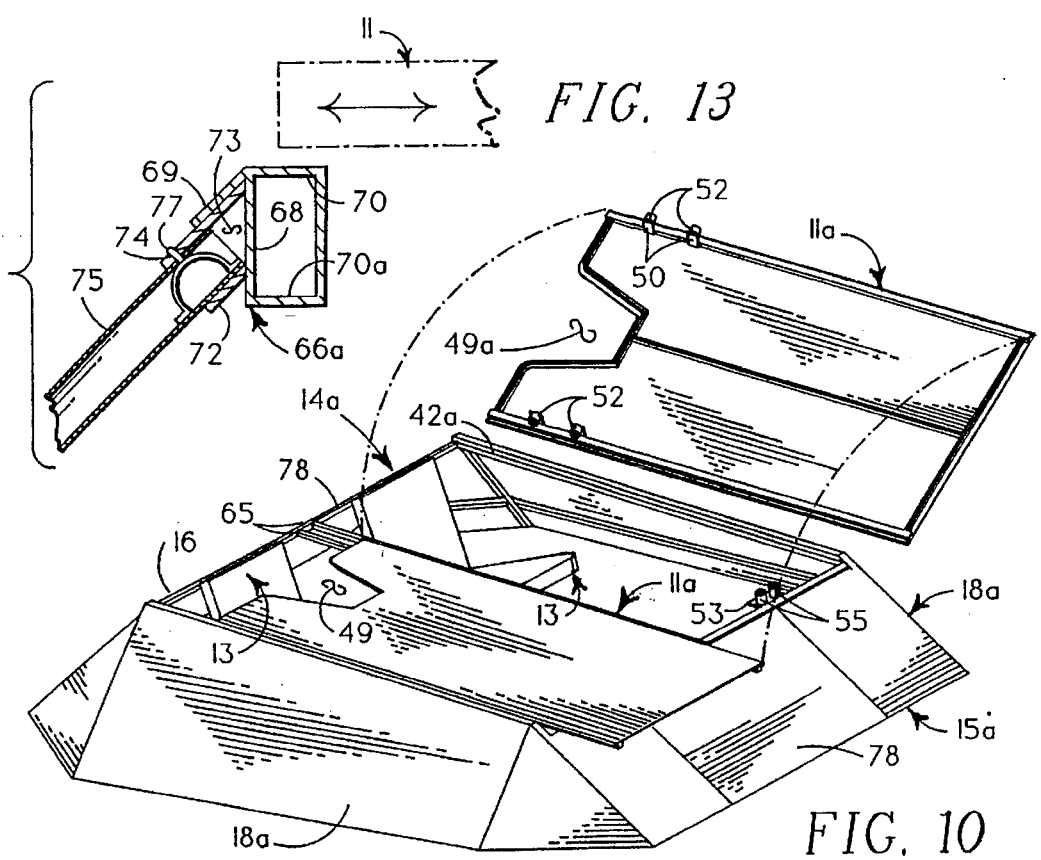
FIG. 13
FIG. 10

5,647,159

PORTABLE HUNTING BLIND WITH SLIDABLY OPENING TOP

BACKGROUND OF INVENTION

IIA. Related Applications

There are no applications related hereto heretofore filed in this or any foreign country.

IIB. Field of Invention

This invention relates generally to disassemblable portable bunting blinds having a peripheral frame supporting a hunter concealing covering, and more particularly to such a blind that has a slidably openable top.

IIC. Background and Description of Prior Art

Portable blinds have long been known and used by hunters and observers of animals to aid such persons in accomplishing their objectives. In the course of their development, portable blinds have become quite sophisticated and often specialized for particular purposes, though there still remain unresolved problems with such blinds for hunters. The instant invention seeks to provide a new and novel portable blind for hunters that resolves various of the heretofore unresolved problems.

For a portable blind to be effective, it must be of relatively light weight and dissssemblable nature so that its components may form a relatively small compact assemblage for transport and storage. At the same time the disassembled components must not be too small or numerous or of such nature as to make assemblage difficult. My blind addresses this problem by providing a structure having a rigid peripheral frame supporting a covering that has a camouflaged exterior surface. The frame is of relatively low vertical profile and of elongate, somewhat rectilinear configuration so that it may be disassembled into two or more side pieces and a top member. Prior blinds generally have not been so readily disassemblable and compactible into as small a space when disassembled, while yet maintaining relatively few components of substantial size for easy assemblage.

A portable hunting blind for practical utility must be capable of assemblage in a simple rapid fashion into a rigid durable structure without the required use of tools which may not be available for the purpose. My blind provides a framework formed of channel elements which at permanent joints are joined by welding and at releasable joints are joined by smaller channel elements carried within the channels of larger elements and positionally maintained by bolt fasteners with manually manipulatable wing nuts. Prior disassemblable blinds generally have not provided a peripheral frame with slip-type joints that are fastenably maintained by bolting, so that their interconnections are not so strong, secure or rigid as those of the instant blind.

A hunting blind to be useful must allow users to rapidly gain egress for shooting of game. The timing and manner of this egress are especially important in water fowl blinds because the birds fly quite fast and often are near maximum shooting range when blind egress is instituted. The opening of the blind for shooting must also be sure and complete so that nothing blocks either gun egress or a shooter's posturing. My blind provides a flat, rigid top portion that is slidably movable from its normal covering position on the blind to an opened position while still remaining interconnected to the blind structure. This motion may be accomplished instantaneously to have the entire top of the blind structure open for gun egress and hunter positioning in distinguishment from prior blinds that have not possessed this feature.

A blind to be practical for a hunter must allow hunter viewing of the area about the blind and yet maintain the hunter in a reasonably comfortable concealed position. My blind accomplishes this function in one species for use on a planar support by providing one or more seats depending from the upper end portion of the side frame to support hunters in a seated positioned, with their heads projecting above the slidable top through holes defined therein and with their hips and upper legs supported above the underlying earth. This hunter positioning has the secondary benefit in that the hunter is in a seated position when the top of my blind is opened, so that he may readily position himself for shooting in this position without having to move extensively to sit up from a prone position to allow shooting. My blind also may be used over a pit to allow hunter positioning as desired in the pit itself.

The elongate configuration of my blind for hunters seated in one end allows guns to be supported on a transverse support forwardly of the seats so that guns extend in a forward and upward direction which tends to provide maximum safety for users of the blind if guns are accidentally discharged. Additionally with this gun orientation when the top is moved to an opened position, the forwardly extending guns become exposed so that they may be easily manipulated and moved to a shooting position. Prior blinds have either made no provision for gun support and storage or have positioned guns where they may not be readily accessed or moved to project from the blind and are not safely maintained in a position such that their accidental discharge may not endanger users of the blind.

By reason of the profile of my blind and its peripheral frame, it may be covered with either fabric or sheet plastic elements and the surface may be enhanced by local vegetation or other camouflage material. Many portable blinds of the prior art will not accommodate such camouflage because of their external configuration and the manner in which they open or move to allow ingress and egress, though local vegetation, debris, and similar material well may provide better camouflage than any type of artificial elements.

A second species of my blind may have both the frame and covering formed of polymeric material. This species allows blind formation by economical molding processes to create a unitary structure or one that may have a small number of parts that may be easily assembled into a complete structure.

My invention resides not any one of these features individually, but rather to the synergistic combination of all of its structural elements which necessarily give rise to the functions flowing therefrom as specified and claimed.

SUMMARY OF INVENTION

My portable blind provides a peripherally defined disassemblable side frame configured as a truncated pyramid with a top rollably supported on the side frame for motion between a covering and an open position. The side frame and top support a peripheral covering optionally carrying natural camouflage material, to define a low profile, elongate blind for concealment of one or more hunters. The side frame optionally supports one or more seats for hunters, and the top defines one or more openings at its inner end above the seats to allow hunters' heads to project through the top. The side frame is formed of channel elements structurally joined at releasably interconnected joints by smaller channel elements in the frame channels and positionally maintained by nut-bolt combinations. The peripheral covering is formed of fabric or sheet material that provides a camouflaged appearance. The frame optionally carries a forward, laterally extending gun support to maintain hunters' guns in a forwardly and upwardly extending orientation beneath the top.

A second species of blind provides a frame and covering unitarily formed from polymeric material so that manufacture may be accomplished by molding. A third species provides a side frame with releasably interconnected legs that allow greater compaction and inexpensive manufacture.

In providing such a structure, it is:

A principal object to provide a portable blind that has a slidably carried top to provide easy ingress, egress and shooting posturing while allowing continuous observation by a user.

A further object is to provide such a blind that is formed by a light, durable channel frame supporting a peripheral covering so that the blind may be disassembled into compactly arrayable portions for transportation and storage.

A further object is to provide such a blind that has fastening elements maintained in frame channels at joints to allow simple and easy manual assemblage and disassemblage without the use of tools while yet maintaining strength and rigidity.

A still further object is to provide such a blind that may be used directly on the surface of the earth, with or without seats for users, or may be used without seats as a cover over a pit in the earth.

A still further object is to provide such a blind that is of new and novel design, of rugged and durable nature, of simple and economic manufacture and one otherwise well adapted to the uses and purposes for which it is intended.

Other and further objects of my invention will appear from the following specification and accompanying drawings which form a part hereof. In carrying out the objects of my invention, however, it is to be remembered that its accidental features are susceptible of change in design and structural arrangement with only the preferred and practical embodiment of its best known mode being illustrated and specified as is required.

BRIEF DESCRIPTION OF DRAWINGS

In the accompanying drawings which form a part hereof and wherein like numbers of reference refer to similar parts throughout:

FIG. 1 is an isometric view of the frame of the first species of my blind for use by one hunter, with the cover removed to show the frame parts, their configuration and relationship.

FIG. 2 is an elongate, vertical isometric sectional view of a lateral portion of the frame of FIG. 1, taken on the line 2—2 thereon in the direction indicated by the arrows.

FIG. 3 is a traverse vertical isometric sectional view of the rearward portion of the frame of FIG. 1, taken on the line 3—3 thereon in the direction indicated by the arrows.

FIG. 4 is an enlarged, partial plan view of a portion of the blind of FIG. 1 showing the medial roller assembly that directs the motion of the top element.

FIG. 5 is an enlarged partial isometric view of a portion of the rearward corner portion of the top frame, showing the laterally extending rollers that support the top frame for lineal motion.

FIG. 6 is an expanded partial isometric view of a portion of the blind of FIG. 1 showing the interconnection of an end panel to the adjacent portion of a side panel of the side frame.

FIG. 7 is an isometric view of a blind similar to that of FIG. 1, with seat removed, positioned over a pit shown in cross-section in the earth.

FIG. 10 is an isometric view of a molded plastic species of blind for two hunters, with two sliding top elements, one of which is removed to better show structural details.

FIG. 13 is an enlarged vertical elongate cross-sectional view through the forward element of the top portion of the frame of FIG. 11, taken on the line 13—13 thereon in the direction indicated by the arrows.

DESCRIPTION OF THE PREFERRED EMBODIMENT

Figure 8:
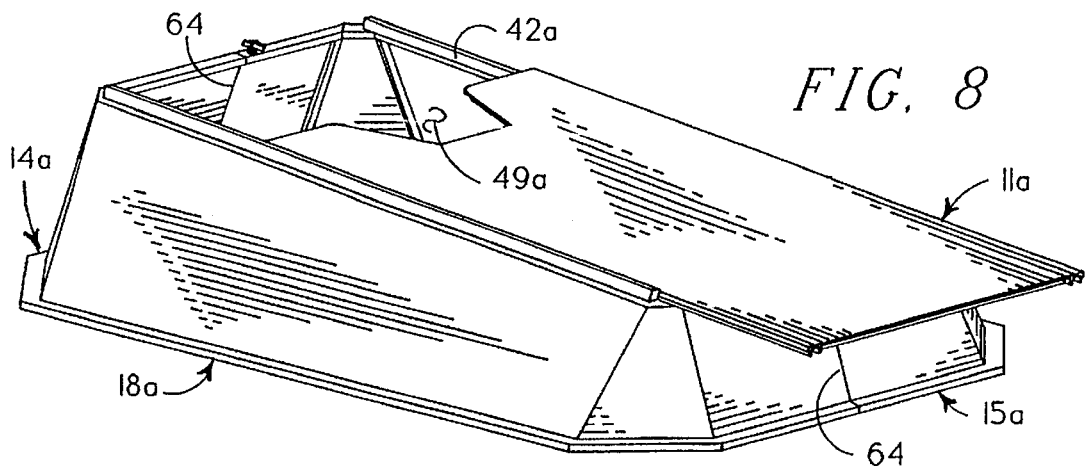
FIG. 8 is an isometric view of a second species of blind for one hunter that is formed with a unitary frame and covering by molding from plastic.

The first species of my being illustrated in FIGS. 1–6 generally provides a peripheral body formed by similar end frames 14, 15 and side frames 18 slidably carrying top structure 11, all supporting peripheral covering 12. Optionally one or more seats 13 may be supported by the frame.

Similar rectilinear rearward end panel 14 and forward end panel 15 are joined at their side edges to similar side panels 18 that are mirror images of each other to form the body. Both forward and rearward end panels are formed by similar upper and lower crosspieces 16 structurally interconnected at their ends by perpendicular side stringers 17. The side panels 18 are formed by similar spaced upper and lower crosspieces 19 interconnected in their medial portions by side stringer 20 and in their end portions by similar side legs 21 which extend downwardly and outwardly to a position spacedly beneath the lower crosspiece to there carry angulated lower feet 22 of somewhat greater areal extent than that of a cross-section through the side legs.

Each end of side panels 18 supports a corner structure having lower crosspiece 23 interconnecting outwardly angulated corner leg 24. The corner leg depends below crosspiece 23 and carries angulated foot 22 at its lower end to rest on a horizontal surface. The upper end of the corner leg 24 is supported by the end portion of the upper crosspiece 19. The corner legs are so oriented that there is a ninety degree included solid angle between the side leg 21 and the corner leg 24, with the corner leg being coplanar with the upper side crosspiece and the side leg being perpendicular to that crosspiece. The feet 22 on each side and corner leg are coplanar as are the lower side crosspiece and lower corner crosspieces.

All structural elements of the side frame are formed of channel members, in the first species illustrated in FIGS. 1–6 of a rectilinear cross-section, but such cross-sectional configuration is not critical and channel elements of other cross-sectional shapes such as cylindrical tubing are within the ambit and scope of my invention. The material from which the channel elements are formed is not critical so long as it provides the necessary physical parameters of strength and rigidity required of it, but for portability the mass should be no greater than necessary. I prefer channel elements formed of lighter metal such as aluminum or of the harder and more dense polymeric or resinous plastics. The permanent interconnection of adjacent portions of the frame elements may be accomplished by known joinder methods, but preferably is accomplished by welding in the case of metals or adhesion in the case of plastics.

A vertical inner corner leg 25 may extend downwardly from the end portion of each upper side crosspiece 19 to provide additional support and rigidity for the frame if necessary or desired. This leg carries foot 22 in its lowermost portion and is of such length as to make its foot 22 coplanar with the feet carried by the other depending legs of the side panels.

The end and side panels of the body frame are releasably interconnected to each other as seen in FIG. 6 of the drawings to allow disassemblage. When assembled these elements are angulated somewhat inwardly from the vertical in an upward direction to provide a truncated pyramidal peripheral configuration for the body for greater strength and rigidity. The end portions of the side stringers are appropriately configured to form a secure joint with the adjacent crosspieces. The side and corner legs are dimensioned and feet 22 are so configured that all feet are in a coplanar relationship for support on a horizontal surface. The forward portion of my blind does not require as much vertical height as the rearward portion by reason of the space occupied by seated hunters, and the blind is angulated somewhat downwardly in a forward direction to lessen its mass and size. This top angulation also aids the opening of top 11 by action of gravity.

Each end portion of upper side crosspiece 19 structurally carries perpendicular inwardly extending connecting arm 26. This connecting arm is of the same cross-sectional shape and incrementally smaller than the channel defined by the upper crosspieces 16 of the end elements so that the connector will extend in a slidable fit within channel 27 defined in the upper cross piece 16. Fastener hole 28 is defined spacedly inwardly of each end of end crosspiece 16 and cooperating fastener hole 29 is defined in the end portion of connector 26 so that when the frame elements are in an assembled relationship, the two fastener holes 28, 29 are aligned and receive therethrough bolt 30 having enlarged, threadedly engaged nut 31 to aid manual manipulation for releasable fastening of the frame elements. A second fastener hole 32 is defined in the lower medial portion of corner leg 24 extending toward end stringer 17 to cooperate with hole 33 defined through stringer 17 to receive fastener bolt 34 therethrough for fastening by enlarged, threadedly engaged nut 35. With this fastening structure, the side panels are structurally joined to the end panels in a secure releasable fashion to establish and maintain the assembled mode of my blind, hut yet allow simple and easy disassembly by manual means for portability and storage.

The forward medial portion of each upper crosspiece 19 of each side panel carries an "L" shaped gun support bracket having vertical leg 36 depending from support on the crosspiece and interconnecting inwardly extending support leg 37. Gun support beam 38 is an elongate channel element defining internal channel 38a to slidably receive the inwardly extending support legs 37 of the gun support brackets in each end for positional maintenance thereon. The gun support beam 38 will be positionally maintained by reason of the interconnection with the gun support brackets in the assembled mode of my blind without further fastening.

Figure 14:
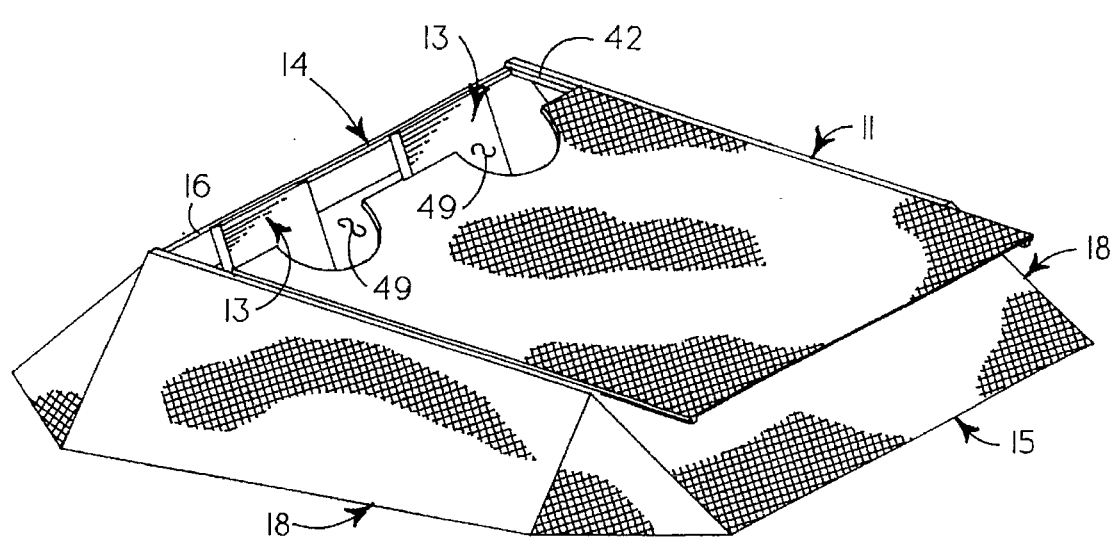
FIG. 14 is an isomeric view of a blind having a unitary top for use by two persons.

One or more "L" shaped seats 13 having back 39 and structurally interconnected seat 40 may be carried by the upper crosspiece of rearward end panel 14 to extent forwardly therefrom, as shown in FIGS. 1–3. The lowermost portion of the seat preferably is coplanar with feet 22 of the various legs, or if not a support (not shown) is provided to depend from the seat so that the seat may be supported on a surface supporting the feet. Preferably if my blind has seats, each seat is additionally supported by an elongate channel type seat support beam 41 extending from the lower crosspiece of rearward end panel 14 to the lower portion of the seat back. Depending upon the particular size and configuration of a blind, it may support more than one seat, but practical utility dictates that there not be more than three seats in an individual blind structure. A blind structure having a top defining two seats is shown in FIG. 14. The seats and their supports are not essential to my blind, but are within its ambit and scope when weight is not a problem.

Top structure 11 provides elongate top support elements 42 of "U" shaped cross-section that define channels 43. The top support elements are structurally carried by each of the inward facing surfaces of each upper crosspiece 19 of each side panel 18 in an orientation such that channels 43 open inwardly toward each other in parallel relationship. The top support elements have a length to extend between the opposed upper crosspieces 16 of forward and rearward end panels 14, 15.

The top has a flat rectilinear base with similar elongate side elements 44 structurally joined by forward crosspiece 45 and medial crosspiece 46. Medial elongate brace 47 extends between the opposed medial portions of the forward and medial crosspieces 45, 46 to provide additional strength and alignment means. Rearward crosspiece 48 defines at least one medial bead slot 49, in the instance of the first species illustrated of semi-circular configuration, depending upon the width of the blind and the number of hunters that are to be accommodated in it. The head slot 49 is defined above each seat used, and the size of the head slot is such as to allow a person's head to be moved readily therethrough. A blind having two head holes for use by two hunters is shown in FIG. 14. All of these elements of the top are formed from channel material of the same or similar nature to that from which the side frame is formed.

The upper surface of the top base may be configured with an upwardly extending curvilinear shape as illustrated in FIG. 1 if desired to provide somewhat greater user concealment. Here laterally extending arched rod 79 is carried by the side elements above the medial top crosspiece and elongate arched rod 180 extends from the medial portion of rod 79 over the medial elongate brace to the forward crosspiece. This structure is optional and not a necessary part of the top structure.

As shown in FIGS. 2 and 5, the rearward portion of each inwardly facing surface of side elements 44 support two spaced, depending top roller brackets 50, each carrying perpendicular, laterally outwardly extending roller axles 51 journaling rollers 52. The rollers 52 are incrementally smaller in diameter than the vertical dimension of the channels 43 defined in top support elements 42 and are so positioned as to extend simultaneously into both channels 43 to rollably support each side of the rearward portion of the top therein.

As seen in FIGS. 2 and 4, the upper crosspiece 16 of forward end panel 15 supports rearwardly extending forward roller bracket 53 carrying two vertically upstanding, laterally spaced roller axles 54, each journaling guiding rollers 55. The rollers 55 are so configured and arrayed as to rollably support medial elongate brace 47 therebetween to guide the direction of movement of that brace during opening and closing of the top member relative to the frame.

If the forward end panel bas less height than the rearward end panel, the support elements 42 will slope downwardly in a forward direction. With such construction the opening of the top will be aided by gravity to make the opening easier and require less force than if it were in horizontal or upwardly angling orientations, though all such orientations are within the scope of my invention.

Covering 12 provides sheet-like material 56 that separately covers each of the side panels, end panels and top of my blind frame. The covering 56 preferably is of a fabric-like material such as canvas or burlap, though other sheet materials, either flexible or semi-rigid, such as formed plastic, metal or similar thin material are within the ambit and scope of my invention. The covering is structurally joined to the elements of each separable blind frame member by known means appropriate for the materials involved. In the case of fabric covering a plastic frame, staples and adhesion are an appropriate joining means; with fabric covering metal frames, clips, adhesion and sewing, individually or in combination, are appropriate. The covering may be of an inherently camouflaged nature, may be imprinted with various camouflage patternation by painting, dying, or the like, and may have affixed to it various camouflage materials such as local vegetative matter, according to the desires of the user and the demands of the blind's environment.

Figure 9:
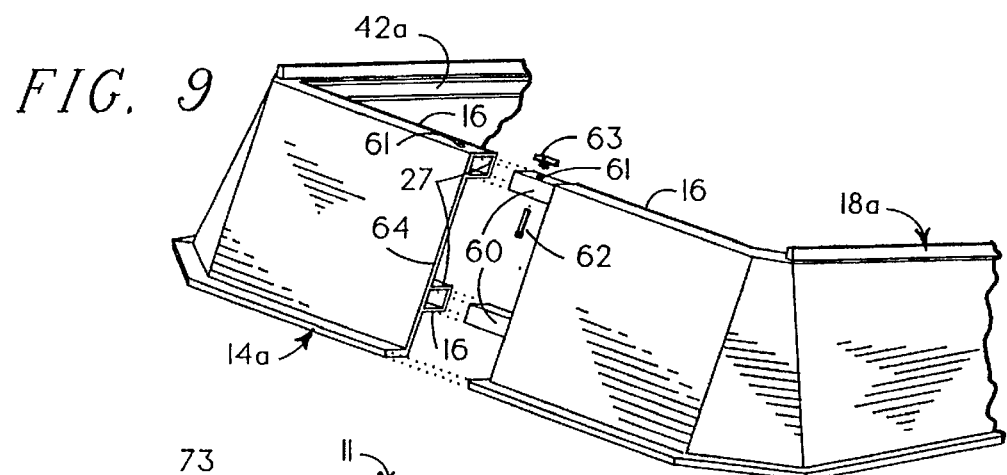
FIG. 9 is a partial, expanded isometric view of a portion of the blind of FIG. 8 to show the interconnection of its portions.

A second species of blind that has a plastic frame supporting a sheet plastic covering is illustrated in FIGS. 8–10. This type of plastic blind is adapted to formation by known plastic molding processes to provide a structure that is simply, easily and inexpensively manufactured, but yet provides the rigidity, strength and durability required for its use.

This second species of blind provides the same type of peripheral framework as the first species, except no inner corner legs are required by reason of the unitary structure of the various members forming the blind periphery and the method of joining them. The various frame elements of the second species need not be formed with channels throughout their entire length, but channels are defined in at least the end portions of frame elements that are to be joined with each other so that such frame elements may be joined as illustrated in FIG. 9. Joint supports 60 slidably interfit in channels defined in the end portions of the frame elements to be joined. Each adjacent end portion of the joined frame elements 16 defines a hole 61 extending therethrough to receive bolt 62 and threadedly engaged enlarged nut 63 for manual manipulation as in the first species.

The second species of my blind for use by one hunter may be conveniently formed with only two releasably joined members, as illustrated in FIGS. 8 and 9. In this form of my blind, the forward end panel 15a and rearward end panel 14a are split vertically in their redial portions and each half end portion is unitarily formed with the side panel 18a which is adjacent thereto. With this construction, the assembled blind bas only one medial seam 64 in each end member, and each side member is a mirror image of the other. The upper and lower crosspieces 16 are joined at the medial seam in the fashion illustrated in FIG. 9 to provide a strong, rigid interconnection that yet is manually releasable.

The top structure 11a of the second species of blind is substantially the same as that of the first species, and it is movably supported on the side panel in the same fashion as in the first species. In the instance illustrated head hole 49a is formed in the shape of a trapezoid rather than a semi-circle. If desired for additional strength or smoother operability, the top support channel elements 42a may be separately formed from metal and structurally fastened to the upper edge portion of side panels 18a by mechanical fasteners such as bolts, rivets, screws or by adhesion or welding.

The second species of blind may be readily expanded to accommodate two or more persons as illustrated in FIG. 10. This blind has the same side panels 18a as the one-man species illustrated in FIG. 8. Here however, similar medial end panels 78 are joined between the opposed inner ends of the end elements 14a, 15a to form a wider structure. Both forward end panel 15a and rearward end panel 14a are substantially the same as their corresponding elements in the one user species, and they are joined to the medial end panels 78 which are of similar cross-sectional configuration in the same fashion as illustrated in FIG. 9.

The medial portion of the upper crosspiece 16 of the forward and rearward end panels structurally carry back-to-back medial channel elements 65 arranged with their channels opening toward the nearest side panel. This blind structure supports two similar top members, each of which is the same as for the one-man blind and each is supported in the same fashion in the medial channels of the adjacent channel supporting elements. A multi-user blind having a single larger top member (not shown) with multiple head holes and supported between lateral top support elements is within the scope of my invention.

Figure 12:
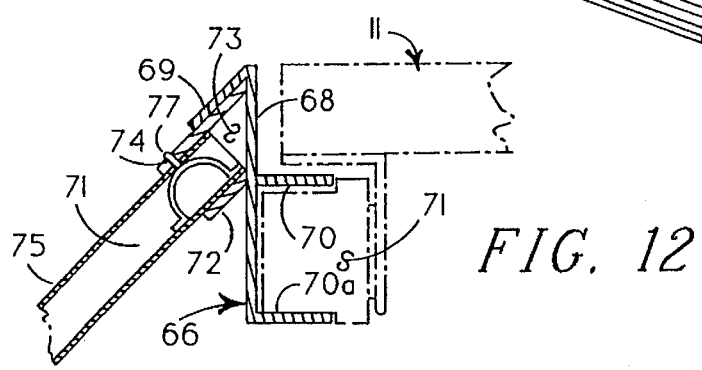
FIG. 12 is an enlarged vertical transverse cross-sectional view through a side element of the top portion of the frame of FIG. 11, taken on the line 12—12 thereon in the direction indicated by the arrows.
Figure 11:
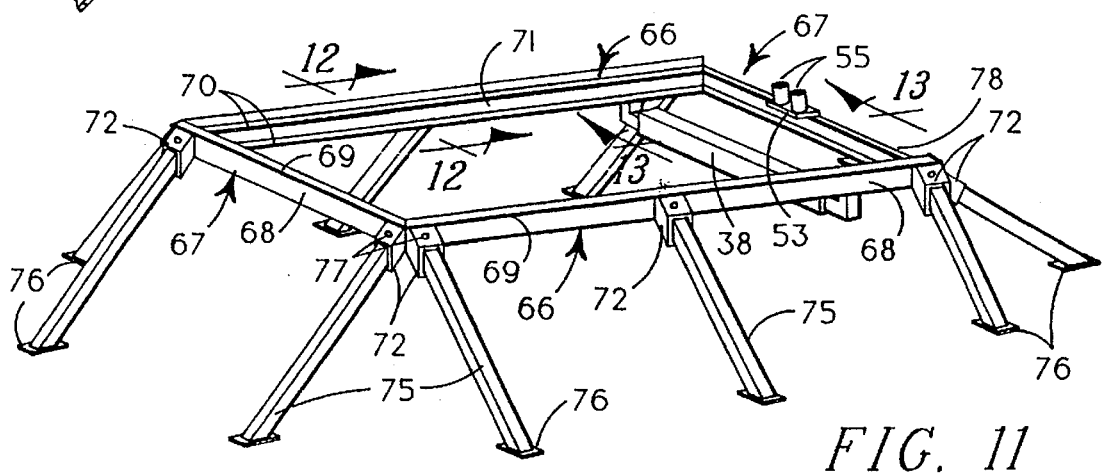
FIG. 11 is an isometric view of a third species of blind that provides a frame having a unitary top portion interconnecting releasably carried legs.

A third species of my blind that is designed especially as an economical structure for use by a single hunter is illustrated in FIGS. 11–13. The top member of this species is the same as that of in the first species, but the body differs in that it provides only similar upper side crosspieces 66 structurally joined to upper end crosspieces 67 to form the periphery of the upper orifice of the blind structure without lower horizontal supports extending between the legs. The upper side crosspieces 66, as illustrated in cross-section in FIG. 12, combine in a single extrudable element the structures and functions of the side crosspieces 19 and top support elements 42 of the first species. The crosspieces 66 provide vertical side elements 68 with downwardly and outwardly extending angulated top portion 69 and two spaced horizontal channel legs 70, 70a extending inwardly therefrom to define therebetween channel 71 which is comparable to channel 43 of the first species. This particular design of the upper side crosspiece 66 allows formation of the elements from appropriate material by an extrusion process to decrease cost but yet provide appropriate strength and rigidity. The upper end crosspieces 67 are rigid channel beams that do not need to define a channel for the support wheels of the top but do have angulated top portion 69 to aid interconnection of leg coilers. The forward end crosspiece 78 must have an upper surface that does not extend vertically above upper channel leg 70 to allow the top member to move forwardly over the crosspiece 78 when the top member is opened, as shown in FIG. 13.

The upper frame of this third species structurally supports a plurality of leg collars 72 defining internal channel 73 to receive legs 75. These leg collars are structurally joined, and preferably symmetrically arrayed, on the outer surfaces of the side and end crosspieces 66, 67, in the embodiment illustrated with three along each side crosspiece and two inwardly adjacent each end of each end crosspiece. Other numbers and arrays of legs, however, are within the ambit and scope of my invention. The collars 72 are angularly oriented relative to the crosspieces, with a downward and outward angulation of approximately forty eight degrees from the vertical. Each collar defines a hole 74 to receive a fastening button of an associated leg in a releasably fastened joinder. Each leg collar carries an elongate rigid leg 75, preferably of a channel type cross-section for appropriate rigidity and weight conservation. All of the legs 75 are similar and preferably carry feet 76 in their lower ends which are all coplanar. Each leg in its upper portion carries an outwardly biased fastening pin 77 that may be moved inwardly against its bias to allow insertion of the leg within a leg collar 72. The pin thereafter to extends by reason of its bias into hole 74 to releasably fasten the leg in the associated collar as heretofore well known.

This third species of blind provides the same top structure and covering as used with the first species and differs only in the structure and method and manner of formation of the frame. If a gun support is used with this third species, it is structurally fastened between the upper side crosspieces in immovable fashion to depend below a top so as not to interfere with top motion, or various known releasable mounting means may be used to allow removal if desired.

Having described the structure of my invention, its use may be understood.

A blind of the first species of FIGS. 1–6 is formed according to the foregoing specifications with similar side panels, forward and rearward end panels and top and with or without seats as desired. These members when disassembled may be amassed in a reasonably compact array for transport, storage or sale. Normally, the various members will be transported to a use site in a non-assembled condition. The blind is light enough, however, that it may be transported in an assembled condition, but it is more bulky in the assembled mode and therefore generally more difficult of cartage, especially if one person is transporting it and there is wind.

For erection of the first species at a use site, a first side member is interconnected with one end panel by moving the members into adjacency, with connector 26 of the side panel extending into the channel 27 of the adjacent upper crosspiece 16 of the end member. The elements are releasably fastened in this position by nut-bolt combinations 30, 31 and 34 and 35 extending through the adjacent frame elements holes defined therein for the purpose. The other end element is joined to the first side panel and releasably interconnected in similar fashion. Gun support 38 is positioned on bracket 36, 37 carried by the first side and the top member is moved to its assembled position with rollers 52 carried within channel 43 defined by the top support element 42 of the first side.

With the structure in this condition, the second side is manually manipulated to its assembled position with its connectors 26 extending into interconnecting engagement in the channels 27 defined by the upper crosspieces of the forward and rearward end panels 15, 14, the bracket 36, 37 supporting the second end of gun support 38, the rollers 52 extending into rollable engagement within channel 43 defined by support element 24 and medial elongate brace 47 rollably supported between guiding rollers 55. The second side then is fastened in this position by inserting nut-bolt combinations 30, 31 and 34, 35 in the cooperating holes 28, 29 and 32, 33 defined in the ends of the second side member. The blind then is in assembled mode.

After assembly the blind is appropriately positioned for use. The blind may be positioned on an area of earth and a hunter or hunters may use the blind by assuming a seated position therein, immediately forwardly adjacent the upper portion of the rearward end panel 14, with feet extending forwardly and head extending through head hole 49. If the blind provides seats, the hunter may assume a similar seated position on the seats and if not, he may be seated on the ground or on a pad supported on the ground with his head projecting through a head hole 49.

A hunter using the blind normally will be using a long gun, generally of the shotgun type. The gun may be supported in the blind with its butt at the lower rearward portion of the blind and its barrel extending forwardly and upwardly for support on gun support 38. This positioning of a gun maintains it in a safe position where any accidental discharge will not harm a hunter in the blind and yet the gun may be quickly and readily accessed for positioning and shooting when desired, as it will be stored in a position where minimum motion is required to move it into a use position.

It should be particularly noted that a hunter may have his head projecting from my blind through a head hole for observation during normal use while in a seated position. When the hunter desires to shoot, the top is moved forwardly, while it remains attached to the frame but yet provides a large opening for egress and for shooter maneuvering, both in relatively free and non-encumbered fashion. Normally a hunter will shoot from a sitting position in my blind, but if desired, the hunter may readily assume a standing or kneeling posture with the cover in open position. It is particularly important with water fowl which fly at substantial speeds that top opening, gun access and hunter posturing be attained as rapidly as possible as otherwise game may be out of range before the hunter is able to shoot at it.

It should further be noted that my blind may be used as a cover for a pit 57 dug in the earth, as shown in FIG. 7 or a tank blind or similar pit-like structure. Pit structures are commonly used in hunting, especially in the hunting of water fowl, but they generally require some covering of their upper opening as most water fowl have good eyesight and can readily distinguish unnatural objects or motions in their environment at substantial distance. My blind may be placed over an appropriately sized pit structure with its feet supported spacedly distant from the peripheral walls defining the pit, as illustrated in FIG. 7, to provide a camouflaged covering for the pit. Hunters may support themselves in the pit at an appropriate elevation to project their heads through head holes 49 so that they may observe the area about the pit. The slidably opening top provides substantially the same advantages for a pit hunter as it does for a hunter seated on the earth, except that the gun support will not normally be used by pit hunters because there is no need for such a structure and if it were used, it would require additional specialized structures to aid in supporting guns.

It should further be noted that the species of my blind may be designed for one or more hunters. For more than one hunter, the forward and rearward end panels and the top are merely expanded laterally so that the blind may contain the hunters and the top structure may define more than one head hole 49, as illustrated in FIG. 10. This type of blind for more than one hunter differs only in dimension and has the same essential structural elements. The top member may be a widened unitary structure supported on the blind sides or may comprise more than one top member, each independently movable and supported on intermediate support channel elements. Such a multi-hunter blind is used in the same fashion as described for the blind designed for a single hunter.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and

What I claim is:

1. A portable hunting blind, comprising in combination:

a frame having similar opposed sides interconnected by forward and rearward ends, said frame having upwardly and inwardly extending, substantially planar surfaces and defining a top opening to support an openable top structure;

a top structure having elongate top support elements defining channels in one side carried in parallel array by the opposed sides of the frame with the channels facing each other, each top support element supporting a top having similar parallel side elements interconnected by at least forward and rearward crosspieces, with an elongate medial support extending parallel to the side elements between the forward and rearward crosspieces, and said rearward cross piece defining the periphery of at least one forwardly extending head hole, at least one roller carried by the rearward portion of each side element of the top to extend laterally therefrom for rollable support in the channel of each opposed top support element, and two laterally spaced, upwardly extending rollers carried by the frame to receive the elongate medial support of the top therebetween to guide motion of the top from a covering to a substantially non-covering position in the top opening; and covering supported by the outer surface of the frame and top, forwardly of the at least one head hole defined in the top, to conceal a hunter positioned within the blind.

2. The blind of claim 1 wherein the frame supports at least one depending seat beneath each head hole and the vertical height of the frame is such that the head of a hunter seated in the seat projects through the associated head hole and above the top.

3. The blind of claim 1 having an elongate gun support releasably carried between two opposed brackets depending from support the forward portion of the upper part of each side of the frame.

4. The blind of claim 1 wherein the frame is formed by separate opposed side panels interconnected by separate forward and rearward end panels; and adjacent portions of all panels have fastening means for releasably interconnecting each adjacent panel.

5. The blind of claim 4 further characterized by the side panel having depending legs at each end thereof and triangular corner portions having corner legs at each outer edge of each corner portion to fit adjacent the associated end panels.

6. The blind of claim 4 wherein the side panels, end panels and top have frame elements and covering unitarily formed of moldable material and the releasable means of fastening the side panels to the end panels include a connector carried by a crosspiece of one panel to be joined to extend into a channel defined in the crosspiece of a second adjacent panel with a releasable fastener extending through the adjacent portions of the joined first and second panels.

7. A low profile, elongate portable hunting blind with a slidably openable top that is formed by releasably assemblable portions, comprising in combination:

a frame of generally truncated pyramidal configuration having two similar spacedly opposed side panels interconnected by forward and rearward end panels having medial portions, each side panel having a planar medial side portion with upper and lower crosspieces interconnected by side legs at least at each vertical end and planar triangular end portions extending from each end defined by a lower corner crosspiece and a corner leg extending angularly inwardly from each side leg at the vertical ends of the planar side portions to interconnect an end element, all legs depending spacedly below the lower crosspieces and carrying feet for support on an underlying supporting surface, and releasable fastening means interconnecting each side panel to the adjacent forward and rearward end panels;

a top structure having opposed parallel channel support elements carried by the upper crosspieces of the side elements, said channel support elements oriented with inwardly facing channels and supporting a planar top defined by elongate side elements interconnected by forward, medial and rearward crosspieces, said planar top having a medial elongate brace extending between the forward and medial crosspieces, at least one roller support depending from each side element to carry a laterally outwardly extending roller to rollably engage within the adjacent channel defined by top support elements, the rearward crosspiece defining the periphery of a forwardly extending head hole to allow a user to project his head therethrough, and spacedly opposed, vertically oriented guide rollers carried by the upper cross piece of the forward end panel to guide motion of the elongate brace of the top relative to the frame;

and covering carried by side panels, the end panels and the top to define a closure to conceal a hunter carried within the blind.

8. The blind of claim 7 wherein the rearward crosspiece of the top defines more than one head hole.

9. The blind of claim 7 further having a seat carried by the upper crosspiece of the rearward end panel adjacent each head hole to support a hunter with head projecting through the associated head hole.

10. The blind of claim 7 further characterized by the medial portion of the forward and rearward end panels supporting spacedly adjacent medial top support elements having channels and orientated in back to back relationship with channels facing the nearest side top support element and similar tops movably carried between each medial top support element and the nearest side top support element of the frame.

11. A portable hunting blind with slidably openable top formed by releasably assemblable parts, comprising in combination:

a frame having similar, spacedly parallel side crosspieces structurally interconnected in their end portions by forward and rearward end crosspieces, the side crosspieces having two inwardly extending horizontal channel legs to define a channel therebetween;

a plurality of outwardly angulated depending leg collars carried by the side crosspieces and the end crosspieces, each leg collar defining a medial channel and means to fastenably receive the end portion of a leg therein;

a plurality of similar elongate legs carried within each leg collar to depend therefrom and terminate in a substantially coplanar relationship, each leg having means for releasable fastening within its supporting collar;

a top having spacedly parallel side elements interconnected by at least forward, and rearward crosspieces, said rearward crosspiece defining the periphery of at least one forwardly extending head hole, and at least one roller carried by the rearward portion of each side element to extend laterally therefrom for rollable support in the channels defined by the opposed upper crosspieces, and covering supported by the frame and the top to conceal a hunter in the blind.

* * * * *